US009482926B2

(12) United States Patent
Chen et al.

(10) Patent No.: US 9,482,926 B2
(45) Date of Patent: Nov. 1, 2016

(54) LENS STRUCTURE AND 3D DISPLAY DEVICE HAVING THE SAME

(71) Applicant: Au Optronics Corporation, Hsinchu (TW)

(72) Inventors: I-Wei Chen, Hualien County (TW); Hsueh-Fang Yeh, Taoyuan County (TW); Sheng-Ju Ho, Hsinchu (TW); Cheng-Han Tsao, New Taipei (TW); Ching-Tsun Chang, Tainan (TW); Chih-Yuan Huang, Yilan County (TW)

(73) Assignee: Au Optronics Corporation, Hsinchu (TW)

( * ) Notice: Subject to any disclaimer, the term of this patent is extended or adjusted under 35 U.S.C. 154(b) by 245 days.

(21) Appl. No.: 14/514,389

(22) Filed: Oct. 15, 2014

(65) Prior Publication Data

US 2015/0131013 A1    May 14, 2015

(30) Foreign Application Priority Data

Nov. 13, 2013  (TW) .............................. 102141306 U

(51) Int. Cl.
  *G02F 1/1335*  (2006.01)
  *G02F 1/29*    (2006.01)
  *G02B 27/22*   (2006.01)

(52) U.S. Cl.
  CPC ............. *G02F 1/29* (2013.01); *G02B 27/2214* (2013.01); *G02F 2001/294* (2013.01)

(58) Field of Classification Search
  CPC .. G02B 27/2214; G02B 27/26; G02B 5/045; G02B 6/0053; G02F 1/133526; G02F 1/133504; G02F 2001/133607; H04N 13/0404; H04N 13/0434; H04N 13/0409

USPC ...................................................... 349/15, 57
  See application file for complete search history.

(56) References Cited

U.S. PATENT DOCUMENTS

| 5,583,674 A | 12/1996 | Mosley |
| 2008/0252720 A1 | 10/2008 | Kim et al. |
| 2008/0266387 A1 | 10/2008 | Krijn et al. |
| 2013/0286342 A1* | 10/2013 | Momonoi ......... G02F 1/134309 349/139 |
| 2014/0063430 A1* | 3/2014 | Kashiwagi ......... G02B 27/2214 349/139 |
| 2014/0204292 A1* | 7/2014 | Liao .................. G02F 1/134309 349/15 |

FOREIGN PATENT DOCUMENTS

| CN | 103376602 | 10/2013 |
| TW | M388658 | 9/2010 |
| TW | 201421131 | 6/2014 |

* cited by examiner

*Primary Examiner* — Mike Qi
(74) *Attorney, Agent, or Firm* — Jianq Chyun IP Office

(57) ABSTRACT

A lens structure and a 3D display device having the same are provided. The lens structure has unit regions. Each unit region includes upper and lower substrates, an anisotropic birefringence medium, center electrodes, edge electrodes and at least one set of side electrodes. The upper and the lower substrates are disposed oppositely to each other. The anisotropic birefringence medium is located between the upper and lower substrates. The center electrodes, the edge electrodes and the at least one set of side electrodes are located on the upper and lower substrates. The edge electrodes are disposed corresponding to the center electrodes. The at least one set of side electrodes are disposed between the center electrodes and the edge electrodes. An electric field distribution is formed between the center electrodes, the edge electrodes and the at least one set of side electrodes, so that the anisotropic birefringence medium constitutes a Fresnel lens.

31 Claims, 10 Drawing Sheets

LENS STRUCTURE AND 3D DISPLAY DEVICE HAVING THE SAME

CROSS-REFERENCE TO RELATED APPLICATION

This application claims the priority benefit of Taiwan application serial no. 102141306, filed on Nov. 13, 2013. The entirety of the above-mentioned patent application is hereby incorporated by reference herein and made a part of this specification.

BACKGROUND OF THE INVENTION

1. Field of the Invention

The invention generally relates to an optical structure and a 3D display device. More particularly, the invention relates to a lens structure and a 3D display device having the same.

2. Description of Related Art

In recent years, with the advancing of display technology, the users have increasingly higher demands on the display quality (e.g., image resolution, color saturation, etc.) of a display device. Nevertheless, in addition to high image resolution and high color saturation, in level to stratify the demands on watching the real images, a display device that is able to display 3D images also has been developed. A liquid crystal lens, or is referred to as gradient-index lens (GRIN lens), 3D display device is one of the 3D display devices that is broadly adopted. Due to the tilting directions of liquid crystal molecules in a conventional liquid crystal lens 3D display device are inconsistent, thereby the disclination lines tend to occur, and further cause the issues of crosstalk and poor display quality.

SUMMARY OF THE INVENTION

Accordingly, the invention is directed to a lens structure and a 3D display device having the same that can prevent the occurrence of disclination lines, so as to improve the display quality of a 3D display device.

The invention provides a lens structure having a plurality of unit regions, wherein each one of the unit regions of the lens structure includes an upper substrate, a lower substrate, an anisotropic birefringence medium, an upper center electrode, a lower center electrode, an upper edge electrode, a lower edge electrode, at least one set of upper side electrodes, and at least one set of lower side electrodes. The upper substrate and the lower substrate are disposed oppositely to each other. The anisotropic birefringence medium is located between the upper substrate and the lower substrate. The upper center electrode and the lower center electrode are respectively located on the upper substrate and the lower substrate. The upper edge electrode is located on the upper substrate and disposed corresponding to the center electrode. The lower electrode is located on the lower substrate and disposed corresponding to the lower center electrode. The at least one set of upper side electrodes is located on the upper substrate and disposed between the upper center electrode and the upper edge electrode. The at least one lower side electrodes is located on the lower substrate and disposed between the lower center electrode and the lower edge electrode. An electric field distribution is formed between the upper center electrode, the lower center electrode, the upper edge electrode, the lower edge electrode, the at least one set of upper side electrodes, and the at least one set of lower side electrodes, such that the anisotropic birefringence medium constitutes a Fresnel lens.

The invention further provides a lens structure having a plurality of unit regions, wherein each one of the unit regions includes an upper substrate, a lower substrate, an anisotropic birefringence medium, an upper edge electrode, and a lower edge electrode. The upper substrate and the lower substrate are disposed oppositely to each other. The upper edge electrode is located on the upper substrate. The lower edge electrode is located on lower substrate. The driving voltages of the upper edge electrode and the lower electrode have opposite phases and the center positions of the upper edge electrode and the lower edge electrode are disposed oppositely, and an electric field distribution is formed between the upper edge electrode and the lower edge electrode, such that the anisotropic birefringence structure constitutes a gradient-index lens.

The invention further provides a 3D display device including a display panel and a lens structure. The lens structure is located on one side of the display panel, wherein the lens structure is as aforementioned lens structure.

According to the above description, owing to the preferred tilting directions of liquid crystal molecules in the lens structure of the invention, thereby the occurrence of disclination lines and crosstalk can be prevented, and the display quality of a 3D device is further improved.

In level to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
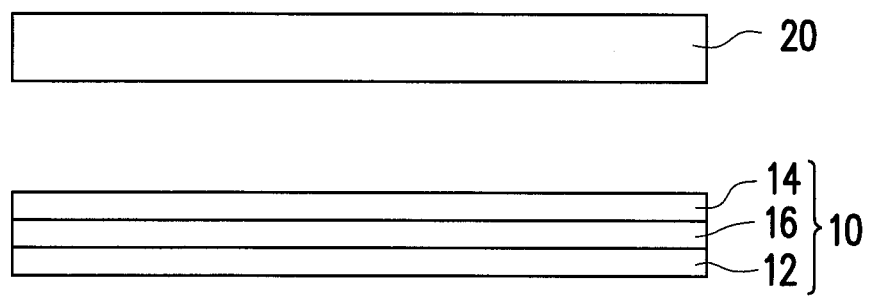
FIG. 1 is a schematic cross-sectional view illustrating a 3D display device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view illustrating a 3D display device 50 according to an embodiment of the invention. Referring to FIG. 1, the 3D display device 50 includes a display panel 10 and a lens structure 20. In the present embodiment, the 3D display device 50 may be, for instance, a liquid crystal lens 3D display device.

The display panel 10 includes a pair of substrates 12, 14 and a display medium 16. The substrates 12, 14 can be made of, for instance, glass, quartz, organic polymer, metal, and other suitable materials. The display medium 16 is located between the substrate 12 and the substrate 14. The display panel 10 may be any element capable of displaying images, and according to a self-luminescent material and a non-self-luminescent material of the display medium 16 in the display panel 10, the display panel 16 may be classified into a non-self-luminescent display panel, including a liquid crystal display panel (e.g., a horizontal electric-field-driven display panel, a vertical electric-field-driven display panel, a blue-phase liquid crystal display panel, a marginal electric-field-driven display panel or other suitable display panels), an electrophoretic display panel, an electro-wetting display panel, an electro-dust display panel or other suitable display panels, and self-luminescent display panels, including an organic electroluminescent display panel, a plasma display panel, a field-emissive display panel or other types of display panels. Wherein, when the display panel 10 adopts a non-self-luminescent material as the display medium 16, the 3D display device 50 may further selectively include a light-source module to provide a needed light source for display.

The lens structure 20 is located on one side of the display panel 10. In the present embodiment, a display surface of the display panel 10 faces toward the lens structure 20, that is, the lens structure 20 is disposed above the display panel 10. As a result, the display panel 10 may have an effect from the lens structure 20, so as to generate a 3D display effect. More specifically, based on this configuration, light emitted from the display panel 10 is refracted through the lens structure 20 to form a left light path projecting to the left eye and a right light path projecting to the right eye, and thereby enable human eyes to see a 3D image. In the following description, the lens structure 20 of the invention will be described in detail.

Figure 2:
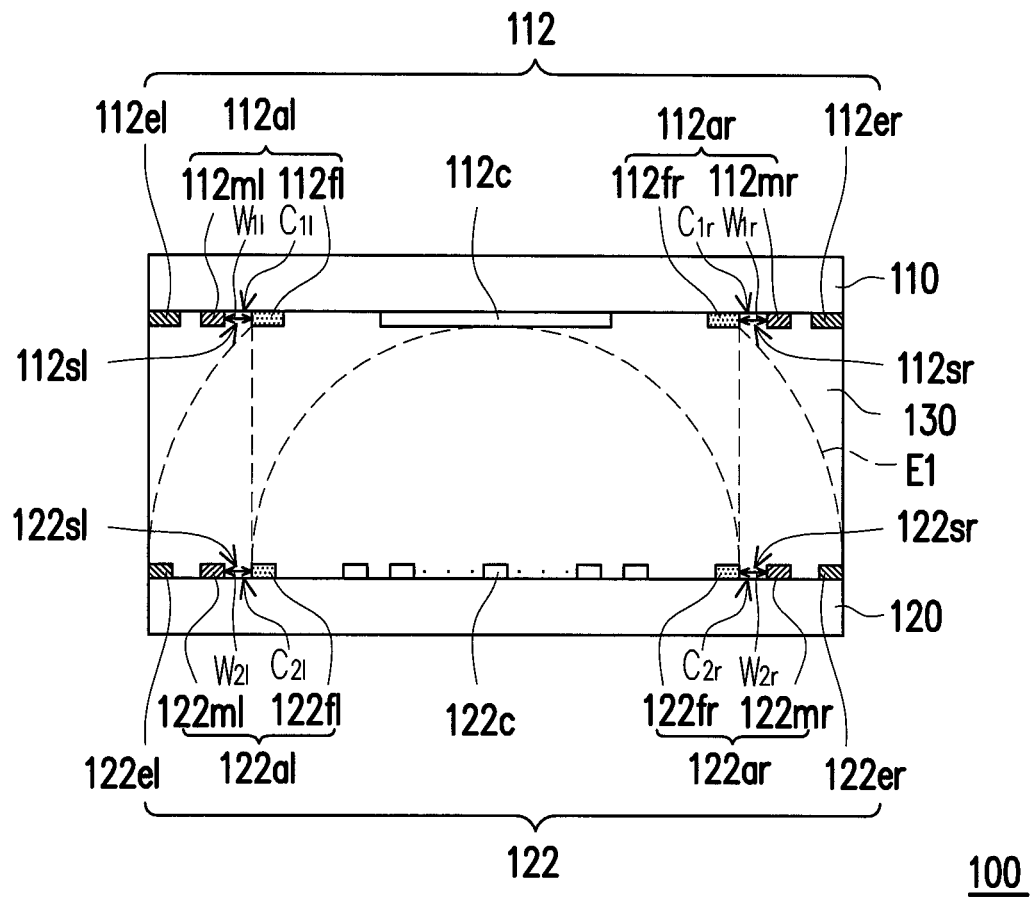
FIG. 2 is a schematic cross-sectional view illustrating a unit region of a lens structure according to the first embodiment of the invention.

FIG. 2 is a schematic cross-sectional view illustrating a unit region 100 of a lens structure 20 according to the first embodiment of the invention. The lens structure 20 has a plurality of unit regions 100. For clearly illustration of the present embodiment of the invention, FIG. 2 solely depicts one of the unit regions 100 of the lens structure 20 in FIG. 1, people skilled in the art should be able to understand that the lens structure 20 of FIG. 1, in fact, the lens structure 20 is constituted by a plural of unit regions 100 shown in FIG. 2 arranged in an array.

Referring to FIG. 2, the lens structure 20 of each unit region 100 includes an upper substrate 110, a lower substrate 120, an anisotropic birefringence medium 130, an upper electrode layer 112 and a lower electrode layer 122.

The upper substrate 110 and the lower substrate 120 are disposed oppositely to each other. The upper substrate 110 and the lower substrate 120 can be made of, for instance, glass, quartz, organic polymer, metal and other suitable materials.

The anisotropic birefringence medium 130 is located between the upper substrate 110 and the lower substrate 120. The anisotropic birefringence medium 130 includes, for instance, a plurality of liquid crystal molecules (not shown), wherein the liquid crystal molecules are optical anisotropic when an electric field is formed and are optical isotropic under a non electric field environment.

The upper electrode layer 112 and the lower electrode layer 122 are respectively located on the upper substrate 110 and the lower substrate 120. Moreover, the upper electrode layer 112 is located between the upper substrate 110 and the anisotropic birefringence medium 130, and the lower electrode layer 122 is located between the lower substrate 120 and the anisotropic birefringence medium 130. The upper electrode layer 112 includes an upper center electrode 112c, an upper edge electrode 112e, and at least one set of upper side electrodes 112a. The lower substrate 122 includes a lower center electrode 122c, a lower edge electrode 122e, and at least one set of lower electrodes 122a. The upper electrode layer 112 and the lower electrode layer 122 can be made of, for instance, indium tin oxide (ITO), indium zinc oxide (IZO), aluminum zinc oxide (AZO), gallium zinc oxide (GZO), indium gallium oxide (IGO), indium gallium zinc oxide (IGZO), or other suitable conductive materials or other desirable light-transmissive conductive materials.

The upper center electrode 112c and the lower center electrode 122c are respectively located on the upper substrate 110 and the lower substrate 120. In addition, the upper center electrode 112c and the lower center electrode 122c are respectively disposed on the center positions of the upper electrode layer 112 and the lower electrode layer 122. In the present embodiment, the upper center electrode 112c, for instance, is a big electrode, and the lower center electrode 122c includes, for example, a plurality of small electrodes, wherein the intervals between the small electrodes are the same. Nevertheless, the invention is not limited herein, in another embodiment, the upper center electrode 112c and the lower center electrode 122c may have other known or suitable electrode configurations, electrode numbers, and electrode patterns.

The upper edge electrode 112e is located on the upper substrate 110 and disposed corresponding to the upper center electrode 112c, and the lower edge electrode 122e is located on the lower substrate 120 and disposed corresponding to the lower center electrode 122c. In the words, the upper edge electrode 122e and the lower edge electrode 122e are respectively disposed at the edge positions of the upper electrode layer 112 and the lower electrode layer 122. More specifically, the upper electrode 112e includes an upper right edge electrode 122er and an upper left edge electrode 122el that disposed correspondingly at the edge positions of two sides of the upper center electrode 112c. The lower edge electrode 122e includes a lower right edge electrode 122er and a lower left edge electrode 122el, and disposed correspondingly at the edge positions of two sides of the lower center electrode 122c.

The at least one set of upper side electrodes 112a is located on the upper substrate 110, and disposed between the upper center electrode 112c and the upper edge electrode 112e. The at least one set of lower side electrodes 122a is located on the lower substrate 120, and disposed between the lower center electrode 122c and the lower edge electrode 122e. Each set of the upper side electrodes 112a includes an upper side main electrode 112f and an upper side auxiliary electrode 112m, and each set of the lower side electrodes 122a includes a lower side main electrode 122f and a lower side auxiliary electrode 122m. Moreover, the at least one set of upper electrodes 112a includes at least one set of upper right side electrode 112ar and at least one set of upper left side electrodes 112al, respectively disposed between the upper center electrode 112c and the upper right edge electrode 112er and between the upper center electrode 112c and the upper left edge electrode 112el. The at least one set of lower side electrodes 122a includes at least one set of lower right side electrodes 122ar and at least one set of lower left side electrodes 122al, respectively disposed between the lower center electrode 122c and the lower right edge electrode 122er and between the lower center electrode 122c and the lower left edge electrode 122el. Each set of upper right side electrodes 112ar includes an upper right side main electrode 112fr and the upper right side auxiliary electrode 112mr, each set of the upper left electrodes 112al includes an upper left side main electrode 112fl and an upper left side auxiliary electrode 112ml, each set of the lower right side electrodes 122ar includes a lower right side main electrode 122fr and a lower right side auxiliary electrode 122mr, and each set of the lower left side electrodes 122al includes a lower left side main electrode 122fl and a lower left side auxiliary electrode 122ml.

It is worth being noted that, in the present embodiment, it is preferred that the upper center electrode 112c, the lower center electrode 122c, the upper right edge electrode 112er, the upper left edge electrode 112el, the lower right edge electrode 122er, the lower left edge electrode 122el, and the at least one set of upper right side electrodes 112ar, the at least one set of upper left side electrodes 112al, the at least one set of lower right side electrodes 122ar and the at least one set of lower left side electrodes 122al are arranged in mirror symmetry.

Besides, the upper side slit 112s is between the upper side main electrode 112f and the upper side auxiliary electrode 112m, and a lower side slit 122s is between the lower side main electrode 122f and the lower side auxiliary electrode 122m. More specifically, an upper right side slit 112sr is between the upper right side main electrode 112fr and the upper right side auxiliary electrode 112mr, an upper left side slit 112sl is between the upper left side main electrode 112fl and the upper left side auxiliary electrode 112ml, a lower right side slit 122sr is between the lower right side main electrode 122fr and the lower right side auxiliary electrode 122mr, and a lower left side slit 122sl is between the lower left side main electrode 122fl and the lower left side auxiliary electrode 122ml. The respective widths of the upper right side slit 112sr, the upper left side slit 112sl, the lower right side slit 122sr and the lower left side slit 122sl are $W_{1r}$, $W_{1l}$, $W_{2r}$, and $W_{2l}$. The respective center positions of the upper right side slit 112sr, upper left side slit 112sl, the lower right side slit 122sr and the lower left side slit 122sl are $C_{1r}$, $C_{1l}$, $C_{2l}$, and $C_{2l}$.

In the present embodiment, a difference between the widths of the upper side slit 112s and the lower side slit 122s is, for example, within 5 microns. That is to say, the difference between the width $W_{1r}$ and the width $W_{2r}$ is within 5 microns, and the difference between the $W_{1l}$ and $W_{2l}$ is also within 5 microns. Moreover, the difference between a vertical projection of the center position of the upper side slit 112s on the lower substrate 120 and the center position of the lower side slit 122s is, for instance, within 5 microns, that is, the difference between the vertical projection of the center position $C_{1r}$ on the lower substrate 120 and the center position $C_{2r}$ is within 5 microns, and the vertical projection of the center position $C_{1l}$ on the lower substrate and the center position $C_{2l}$ is also within 5 microns. In the present embodiment, it is preferred that the width of the upper side slit 112s is in consistent with the lower side slit 122s (i.e., the width difference is 0), and the center positions of the upper side slit 112s and the lower side slit 122s are symmetrical to each other. That is, the difference between the width $W_{1r}$ and width $W_{2r}$, the difference between the width $W_{1l}$ and the width $W_{2l}$, the difference between the vertical projection of the center position $C_{1r}$ on the lower substrate 120 and the center position $C_{2l}$, and the difference between the vertical projection of the center position $C_{1l}$ on the lower substrate 120 and the center position $C_{2l}$ are all equal to 0.

In the present embodiment, an electric field distribution E1 is formed between the upper center electrode 112c, the lower center electrode 122c, the upper edge electrode 122e, the lower edge electrode 122e, the at least one set of upper side electrodes 122a and the at least one set of lower side electrodes 122a, such that the anisotropic birefringence medium 130 constitutes a Fresnel lens. In more detail, the electric field distribution E1 formed between the upper center electrode 112c, the lower center electrode 122c, the upper right edge electrode 112er, the upper left edge electrode 112el, the lower right edge electrode 122er, the lower left edge electrode 122el, the at least one set of upper right side electrodes 122ar, the at least one set of upper left side electrodes 122al, the at least one set of lower right side electrodes 122ar, and the at least one set of lower left side electrodes 122al can make the anisotropic birefringence medium 130 constitute a Fresnel lens. The upper edge electrode 112e and the lower edge electrode 122e are located at the positions of lens pitches of the Fresnel lens. In the present embodiment, the anisotropic birefringence medium 130 constitutes, for instance, a first level Fresnel lens.

Since the invention is able to make the anisotropic birefringence medium 130 constitute a equivalent Fresnel lens through the formed electric field distribution and the designs electrode pattern and voltages of the upper electrode layer 112 and the lower electrode layer 122, also the thickness of the Fresnel lens is smaller than the conventional lens (i.e., a cell gap or a liquid crystal cell gap of the Fresnel lens is smaller), the invention can achieve the effects of reducing device size and lowering down the material cost. The voltage designs of various electrodes of the invention will be elaborated in detail below.

In the present embodiment, a voltage of the upper edge electrode 112e is Ve, a voltage of the lower edge electrode 122e is Ve', a voltage of the upper side main electrode 112f is Vf, a voltage of the lower side main electrode 122f is Vf', a voltage of the upper side auxiliary electrode 112m is Vm, a voltage of the lower side auxiliary electrode 122m is Vm', and a threshold voltage of the anisotropic birefringence medium 130 is Vt.

It is worth being noted that, one of the upper edge electrode 112e and the lower edge electrode 122e has a driving voltage (Ve), and an absolute value of a voltage of the other voltage is less than an absolute value of the threshold voltage (Vt) of the anisotropic birefringence medium 130. That is to say, the voltage of one of the upper edge electrode 112e and lower edge electrode 122e is the driving voltage (i.e., |Ve|>|Vt| or |Ve'|>|Vt|), and the voltage of the other one is a voltage that does not drive the liquid crystal molecules (this voltage may be equal to 0 or smaller than |Vt|, thus it may be |Ve|<|Vt| or |Ve'|<|Vt|).

Furthermore, one of the upper side main electrode 112f of the at least one set of upper side electrodes 112a and the lower side main electrode 122f of the at least one set of the lower electrodes 122a has a driving voltage (Vf), and an absolute value of a voltage of the other one is smaller than an absolute value of a threshold voltage (Vt) of the anisotropic birefringence medium 130. That is, the voltage of one of the upper main electrode 112f and the lower side main electrode 122f is a driving voltage (i.e., |Vf|>|Vt| or |Vf'|>|Vt|), and the voltage of the other one is a voltage that dose not drive the liquid crystal molecules (this voltage may be equal to 0 or smaller than |Vt|, thus it may be |Vf|<|Vt| or |Vf'|<|Vt|).

As a consequence, according to the upper edge electrode 112e, the lower edge electrode 122e, the upper side main electrode 112f of the at least one set of upper side electrodes 112a, and the lower side main electrode 122f of the at least one set of lower side electrodes 122a adopted by the present embodiment, there may be four scenarios of voltage conditions as described below.

The first scenario is that the lower edge electrode 122e and the lower side main electrode 122f respectively have the driving voltages Ve' and Vf', and the absolute value of the voltages of the upper edge electrode 112e and the upper side main electrode 112f are both smaller than the absolute value of the threshold voltage (Vt) of the anisotropic birefringence medium 130. That is, as |Ve'|>|Vt| and |Vf'|>|Vt|, then |Ve|<|Vt| and |Vf|<|Vt|.

The second scenario is that the upper edge electrode 112e and the upper side main electrode 112f respectively have the driving voltages Ve and Vf, and the absolute values of the voltages of the lower edge electrode 122e and the lower side main electrode 122f are both smaller than the absolute value of the threshold voltage of the anisotropic birefringence medium 130. That is, as |Ve|>|Vt| and |Vf|>|Vt|, then |Ve'|<|Vt| and |Vf'|<|Vt|.

The third scenario is that the upper edge electrode 112e and the lower side main electrode 122f respectively have the driving voltage Ve and Vf', and the absolute value of the voltages of the lower edge electrode 122e and the upper side main electrode 112f are both smaller than the absolute value of the threshold voltage (Vt) of the anisotropic birefringence medium 130. That is, as |Ve|>|Vt| and |Vf'|>|Vt|, then |Ve'|<|Vt| and |Vf|<|Vt|.

The fourth scenario is that the lower edge electrode 122e and the upper side main electrode 112f respectively have the driving voltages Ve' and Vf, and the absolute value of the voltages of the upper edge electrode 112e and the lower side main electrode 122f are both smaller than the absolute value of the threshold voltage (Vt) of the anisotropic birefringence medium 130. That is, as |Ve'|>|Vt| and |Vf|>|Vt|, then |Ve|<|Vt| and |Vf'|<|Vt|.

In addition, the voltages of various electrodes of the invention may satisfy the conditions below.

When it is |Ve'|>|Vt| and |Vf'|>|Vt|, then |Vm|>|Vm'| and as it is |Ve|>|Vt| and |Vf|>|Vt|, then |Vm'|>|Vm|.

When it is |Ve|>|Vt|, then |Ve|>|Vf'|>|Vm|>|Vm'|, and as it is |Ve'|>|Vt|, then |Ve'|>|Vf|>|Vm'|>|Vm|. For example, when all the voltages Ve, Vf, Vm, and Vm' are positive values, then Ve>Vf'>Vm>Vm', and when all the voltages Ve, Vf', Vm, and Vm' are negative values, then Ve<Vf'<Vm<Vm'.

When it is |Ve|>|Vt|, then |Vm'|=0~(¼)×|Ve|, and as it is |Ve'|>|Vt|, then |Vm|=0~(¼)×|Ve'|.

When it is |Ve|>|Vt|, then |Vm−Vm'|=0~(½)×|Ve|, and as it is |Ve'|>|Vt|, then |Vm'−Vm|=0~(½)×|Ve'|.

As the above mentioned, the invention has not only designed the electrode patterns of the upper electrode layer 112 and the lower electrode layer 122, but also the preferred voltage conditions of the various electrodes, so that the formed electric field distribution has preferred shapes and effects of the Fresnel lens, thereby liquid crystal molecules in the lens structure have the preferred tilting directions. More specifically, the voltage Vm of the upper side auxiliary 112m and the voltage Vm' of the lower side auxiliary electrode 122m may be adopted to modify the shapes of the oblique attack. In addition, the upper side slits 112s and the lower side slits 122s may be adopted to make the vertical line of the Fresnel lens more in the perpendicular direction. Thus, the designs of electrode patterns and voltages of the invention can prevent the occurrence of disclination lines and crosstalk, and thereby improve the display quality of a 3D display device.

Figure 3:
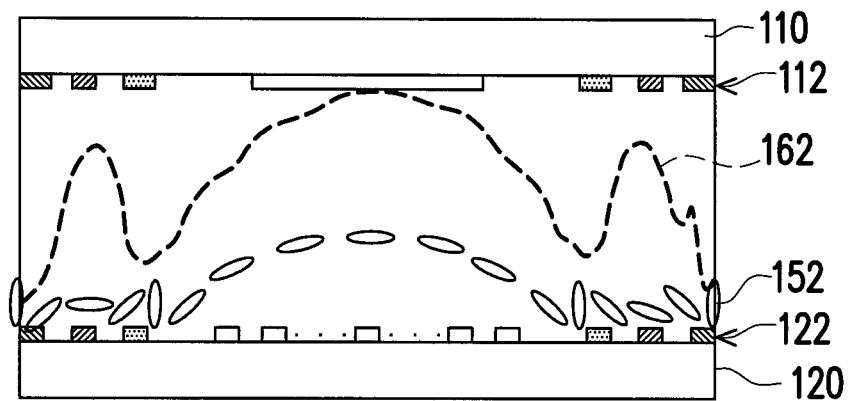
FIG. 3 is a distribution diagram of an electric field and liquid crystal molecules of a unit region in a lens structure illustrated in FIG. 2.

FIG. 3 is a distribution diagram of an electric field and liquid crystal molecules of a unit region 100 in a lens structure 20 illustrated in FIG. 2. More specifically, the voltages of the various electrodes in FIG. 3 may satisfy the following conditions, as it is |Ve'|>|Vt| and |Vf'|>|Vt|, then |Vm|>|Vm'|, and as it is |Ve|>|Vt| and |Vf|>|Vt|, then |Vm'|>|Vm|. For instance, when the lower edge electrode 122e and the lower side main electrode 122f both have the driving voltages on the lower substrate 120 and |Vm|>|Vm'|, then the liquid crystal molecules may be tilted toward correction directions (i.e., toward center positions) through the voltage Vm of the upper side auxiliary voltage 112m. As a distribution of liquid crystal molecules 152 and an electric field distribution curve 162 shown in FIG. 3, due to the electric field curve 162 having preferred shapes and effects of the Fresnel lens, hence, the distribution of liquid crystal molecules 152 may have preferred tilting directions. That is, the distribution of liquid crystal molecules 152 has preferred tilting direction of the liquid crystal molecules of the Fresnel lens that is tilting from outward toward inward.

Figure 4:
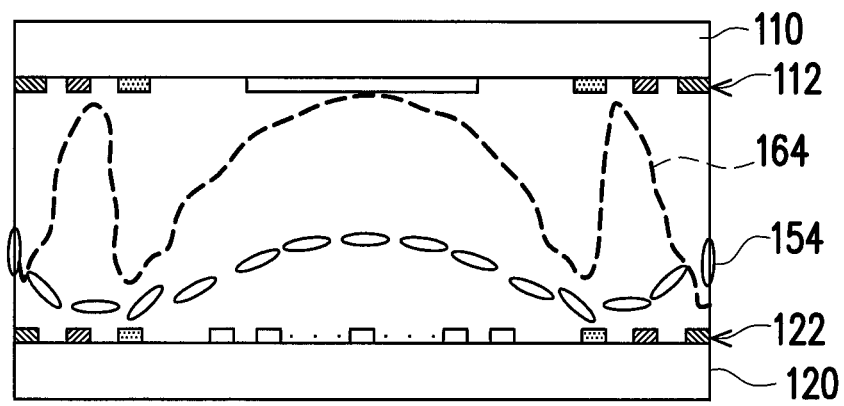
FIG. 4 is a distribution diagram of another electric field and liquid crystal molecules of a unit region in a lens structure illustrated in FIG. 2.

FIG. 4 is a distribution diagram of another electric field and liquid crystal molecules of a unit region 100 in a lens structure 20 illustrated in FIG. 2. More specifically, the voltages of the various electrodes in FIG. 4 may satisfy the following conditions, as it is |Ve|>|Vt|, then |Ve|>|Vf'|>|Vm|>|Vm'| and as it is |Ve'|>|Vt|, then |Ve'|>|Vf|>|Vm'|>|Vm|. For example, when the upper edge electrode 112e has the driving voltage on the upper substrate 110, the lower side main electrode 122f has the driving voltage on the lower substrate 120, and |Ve|>|Vf'|>|Vm|>|Vm'|, then the liquid crystal molecules can be arranged as a wave shape through the formed electric field distribution to prevent occurrence of disclination lines. As a distribution of liquid crystal molecules 154 and an electric field distribution curve 164 shown in FIG. 4, owing to the electric field distribution curve 164 having preferred shapes and effects of the Fresnel lens, such that the distribution of liquid crystal molecules 154 may have more preferred tilting directions. That is, the distribution of liquid crystal molecules 154 may have more preferred ideal tilting direction of the liquid crystal molecules of the Fresnel lens that is titling from outward toward inward in a wave shape.

It is worth mentioning that, from comparing FIG. 3 with FIG. 4, it can be learned that FIG. 4 has more preferred electric field distribution and liquid crystal molecules distribution. In other words, the staggering arrangement manner of the driving voltages of an upper edge electrode and a lower side main electrode or the driving voltages of a lower edge electrode and an upper side main electrode may have most preferred shapes and effects of the Fresnel lens.

The embodiment of aforementioned FIG. 2 adopts an example of the anisotropic birefringence medium 130 constituting a one level Fresnel lens for illustration. Nevertheless, the invention is not limited herein, in another embodiment, an anisotropic birefringence medium may also constitute a N-levels Fresnel lens (such as the two-levels Fresnel lens shown in the second embodiment).

Figure 5:
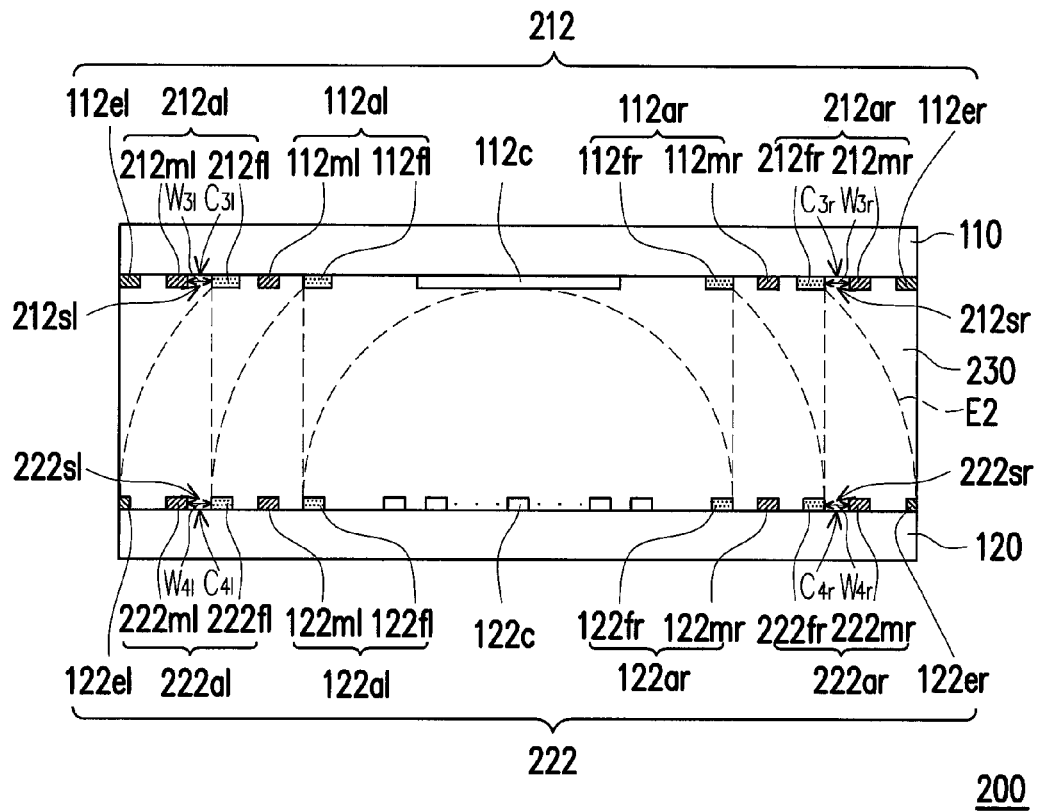
FIG. 5 is a schematic cross-sectional view illustrating a unit region of a lens structure according to the second embodiments of the invention.

FIG. 5 is a schematic cross-sectional view illustrating a unit region 200 of a lens structure 20 according to the second embodiments of the invention. The embodiment of FIG. 5 is similar to the above mentioned embodiment of FIG. 2, accordingly, the same or similar notations represent the same or similar components, while the repeated same details are omitted. The difference of the embodiment of FIG. 5 and the embodiment of FIG. 2 is that an anisotropic birefringence medium 230 constitutes the two-levels Fresnel lens. More specifically, in the embodiment of FIG. 2 (the one level Fresnel lens), the upper electrode layer 112 and the lower electrode layer 122 respectively have a set of the upper side electrodes 112a and a set of the lower side electrodes 122a, while in the embodiment of FIG. 5 (the two levels Fresnel lens), an upper electrode layer 212 and a lower electrode layer 222 respectively have two sets of upper side electrodes (112a, 212a) and two sets of lower side electrodes (122a, 222a). That is to say, when the upper electrode layer and the lower electrode layer respectively have N sets of upper side electrodes and N sets of lower side electrodes, such that the anisotropic birefringence medium constitutes an N levels Fresnel lens.

In the present embodiment, the other set of upper side electrodes 212a is located on the upper substrate 110 and disposed between a set of the upper side electrodes 112a and the upper edge electrode 112e. The other set of lower side electrodes 222a is located on the lower substrate 120 and disposed between a set of the lower side electrodes 122a and the lower edge electrode 122e. Each set of the upper side electrodes 212a includes an upper side main electrode 212f and an upper side auxiliary electrode 212m, and each set of the lower side electrodes 222a includes a lower side main electrode 222f and a lower side auxiliary electrode 222m. Besides, each set of the upper side electrodes 212a includes a set of upper right side electrodes 212ar and a set of upper left side electrodes 212al, respectively disposed between the upper center electrode 112c and the upper right edge electrode 112er and between the upper center electrode 112c and the upper left edge electrode 112el. Each set of the lower side electrodes 222a includes a set of lower right side electrodes 222ar and a set of lower left side electrodes 222al, respectively disposed between the lower center electrode 122c and the lower edge electrode 122er and between the lower center electrode 122c and the lower left edge electrode 122el. Each set of upper right side electrodes 212ar includes an upper right side main electrode 212fr and an upper right side auxiliary electrode 212mr, each set of the upper left side electrodes 212al includes an upper left side main electrode 212fl and an upper left side auxiliary electrode 212ml, each set of lower right side electrodes 222ar include a lower right side main electrode 222fr and lower right side auxiliary electrode 222mr, and each set of lower left side electrodes 222al includes a lower left side main electrode 222fl and a lower left side auxiliary electrode 222ml.

Furthermore, an upper side slit 212s is between the upper side electrode 212f and the upper side auxiliary electrode 212m, and a lower side slit 222s is between the lower side main electrode 222f and the lower side auxiliary electrode 222m. In more detail, an upper side slit 212sr is between the upper side main electrode 212fr and the upper right side auxiliary electrode 212mr, an upper left side slit 212sl is between the upper left side main electrode 212fl and the upper left side auxiliary electrode 212ml, a lower right side slit 222sr is between the lower right side main electrode 222fr and the lower right side auxiliary electrode 222mr, and a lower left side slit 222sl is between the lower left side main electrode 222fl and the lower left side auxiliary electrode 222ml. Wherein, the respective widths of the upper right side slit 212sr, the upper left side slit 212sl, the lower right side slit 222sr, and the lower left side slit 222sl are $W_{3r}$, $W_{3l}$, $W_{4r}$, and $W_{4l}$. The respective center positions of the upper side slit 212sr, the upper left side slit 212sl, the lower right side slit 222sr and the lower left side slit 222sl are $C_{3r}$, $C_{3l}$, $C_{4r}$, and $C_{4l}$.

In the present embodiment, an electric field distribution E2 is formed between the upper center electrode 112c, the lower center electrode 122c, the upper edge electrode 112e, the lower edge electrode 122e, the set of the upper side electrodes 112a, the set of the lower side electrodes 122a, the set of the upper side electrodes 212a, and the set of the lower side electrodes 222a, such that the anisotropic birefringence medium 230 constitutes a Fresnel lens.

Figure 6:
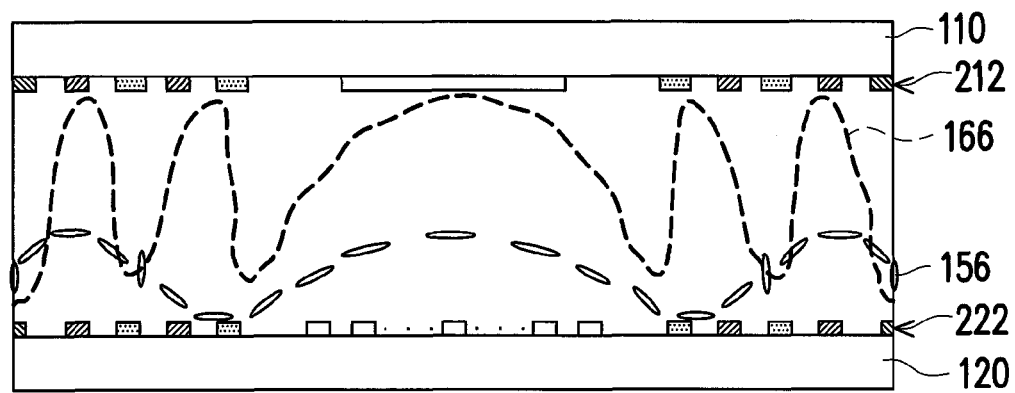
FIG. 6 is a distribution diagram of an electric field and liquid crystal molecules of a unit region in a lens structure illustrated in FIG. 5.

FIG. 6 is a distribution diagram of an electric field and liquid crystal molecules of a unit region 200 in a lens structure 20 illustrated in FIG. 5. To be more specific, FIG. 6 adopts the staggering arrangement manner of the driving voltages of an upper edge electrode, a lower side main electrode and an upper side main electrode or the driving voltages of a lower edge electrode, an upper side main electrode and a lower side main electrode. That is, the driving voltages of the adjacent upper (lower) edge electrode and the lower (upper) side main electrode are staggering arranged, and the driving voltages of the adjacent lower (upper) side main electrode and the upper (lower) side main electrode are also staggering arranged. Therefore, the liquid crystal molecules can be arranged as a wave shape through the formed electric field distribution to prevent the occurrence of disclination lines. As the distribution of the liquid crystal molecules 156 and the electric field distribution curve 166 shown in FIG. 6, owing to electric field distribution curve 166 having more preferred shapes and effects of the Fresnel lens, thus, the distribution of the liquid crystal molecules 156 has more preferred tilting directions. That is, the distribution of the liquid crystal molecules 156 has more preferred ideal tilting direction of the liquid crystal molecules that is tilted from outward toward inward in a wave shape.

In the above mentioned embodiments of FIG. 2 to FIG. 6, which adopt following example for illustration, the electric field distribution is formed between an upper center electrode, a lower center electrode, an upper edge electrode, a lower edge electrode, at least one set of upper side electrodes and at least one set of lower side electrodes, such that an anisotropic birefringence medium constitutes a one level or a two levels Fresnel lens, but the invention is not limited herein. In other embodiments (such as the embodiments shown in FIG. 7 to FIG. 10), an electric field distribution also may be formed between an upper edge electrode and a lower edge electrode, or between an upper center electrode, a lower center electrode, an upper edge electrode, and a lower edge electrode, so that an anisotropic birefringence medium constitutes a GRIN lens. (A 0 level Fresnel lens will be utilized as an example for illustration below.)

Figure 7:
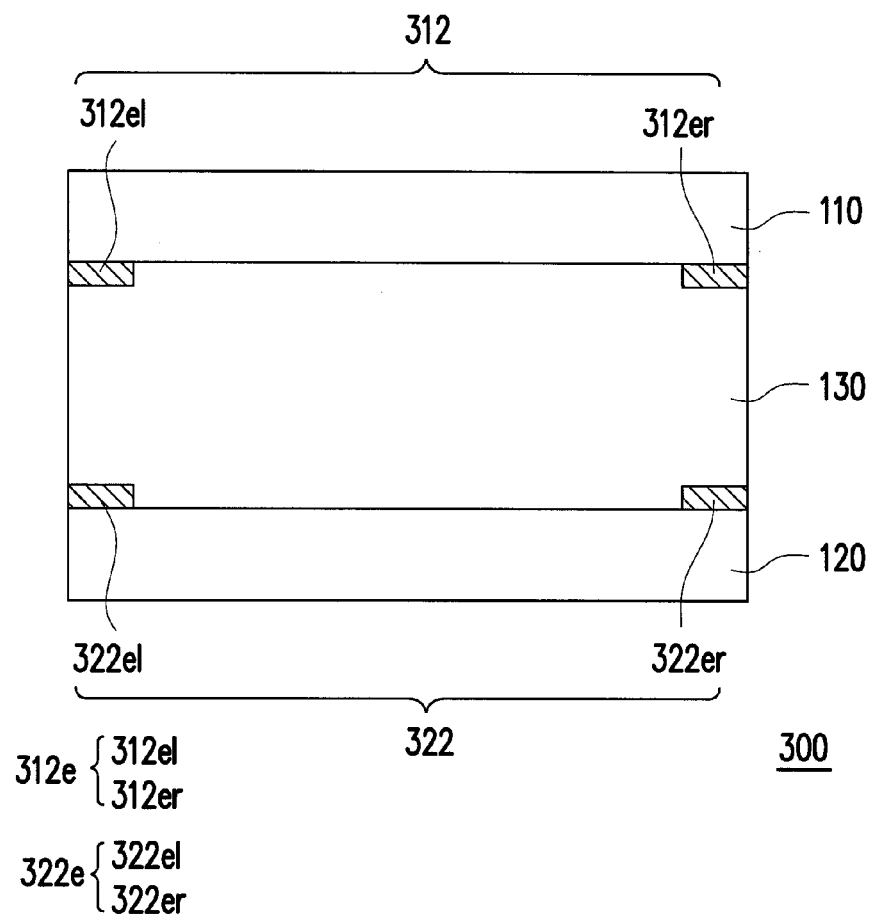
FIG. 7 is a schematic cross-sectional view illustrating a unit region of a lens structure according to the third embodiments of the invention.
Figure 8:
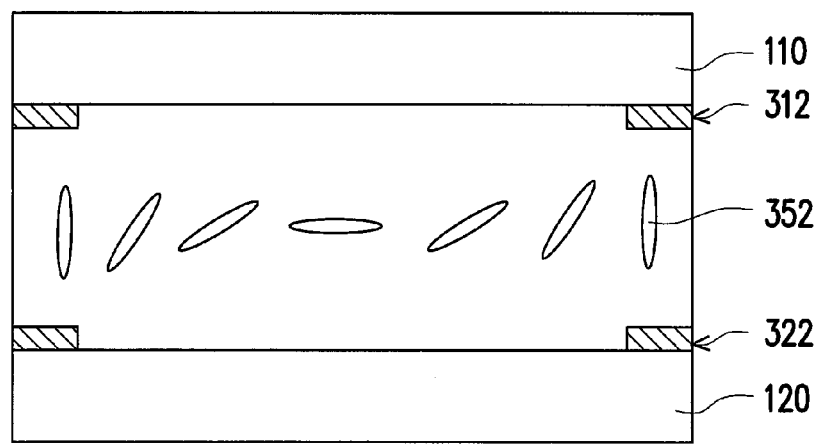
FIG. 8 is a distribution diagram of liquid crystal molecules of a unit region in a lens structure illustrated in FIG. 7.

FIG. 7 is a schematic cross-sectional view illustrating a unit region 300 of a lens structure 20 according to the third embodiments of the invention, and FIG. 8 is a distribution diagram of liquid crystal molecules of a unit region 300 in a lens structure 20 illustrated in FIG. 7. In the present embodiment, the lens structure 20 has, for instance, a plurality of unit regions 300. The embodiment of FIG. 7 and FIG. 8 is similar to the embodiment of FIG. 2 to FIG. 4, thus, similar or same notations represent the similar or same components, while the repeated same details are omitted.

Referring to FIG. 7, each of the unit regions 300 of the lens structure 20 includes the upper substrate 110, the lower substrate 120, the anisotropic birefringence medium 130, an upper electrode layer 312 and a lower electrode layer 322.

The upper substrate 110 and the lower substrate 120 are disposed oppositely to each other, and the anisotropic birefringence medium 130 is located between the upper substrate 110 and the lower substrate 120.

The upper electrode layer 312 and the lower electrode layer 322 are respectively located on the upper substrate 110 and the lower substrate 120. Moreover, the upper electrode layer 312 is located between the upper substrate 110 and the anisotropic birefringence medium 130, and the lower electrode layer 322 is located between the lower substrate 120 and the anisotropic birefringence medium 130. In the present embodiment, the upper electrode layer 312 includes an upper edge electrode 312e, and the lower electrode layer 322 includes a lower edge electrode 322e.

The upper edge electrode 312e is located on the upper substrate 110, and the lower edge electrode 322e is located on the lower substrate 120, wherein the upper edge electrode 312e and the lower edge electrode 322e are respectively disposed at the edge positions of the upper electrode layer 312 and the lower electrode layer 322. To be more specific, the upper edge electrode 312e includes an upper right edge electrode 312er and an upper left edge electrode 312el, and disposed at the edge positions of two sides of the upper electrode layer 312. The lower edge electrode 322e includes a lower right edge electrode 322er and a lower left edge electrode 322el, and disposed at the edge positions of two sides of the lower electrode layer 322.

In the present embodiment, the center position of the upper edge electrode 312e and the center position of the lower edge electrode 322e are disposed oppositely to each other. It is preferred that the upper edge electrode 312e and the lower edge electrode 322e are arranged in mirror symmetry. In more detail, the center position of the upper right edge electrode 312er and the center position of the lower right edge electrode 322er are disposed oppositely to each other, and the center position of the upper left edge electrode 312el and the center position of the lower left edge electrode 322el are disposed oppositely to each other. It is preferred that the upper right edge electrode 312er and the lower right edge electrode 322er arranged in mirror symmetry, and the upper left edge electrode 312el and the lower left edge electrode 322el are arranged in mirror symmetry.

In the present embodiment, the driving voltages of the upper edge electrode 312e and the lower edge electrode 322e have opposite phases. That is, as the driving voltage of the lower edge electrode 322e is Ve, then the driving voltage of the upper edge electrode 312e is −Ve, wherein −Ve and Ve have opposite phases. For example, as the driving voltage of the lower edge electrode 322e is 3V, then the driving voltage of the upper edge electrode 312e is −3V. In addition, a right edge voltage difference ΔVer exists between the upper right edge electrode 312er and the lower right edge electrode 322er, and a left edge voltage difference ΔVel exists between the upper left edge electrode 312el and the lower left edge electrode 322el. An absolute value of a difference between the right edge voltage difference ΔVer and the left edge voltage difference ΔVel is within 2V, that is |ΔVer−ΔVel|≤2V. For example, when the driving voltage of the lower right edge electrode 322er is 3V and the driving voltage of the upper right edge electrode 312er is −3V, and then the right edge voltage difference ΔVer is 6V. Thus, the left edge difference ΔVel may be, for instance, 6V, 5V, or 4V, etc. In other words, the respective driving voltages of the lower left edge electrode 322el and the upper left edge electrode 312el are, for instance, 3V and −3V, 2.5V and −2.5V, or 2V and −2V, etc.

As a result, in the present embodiment, an electric field distribution is formed between the upper edge electrode 312e and the lower edge electrode 322e, such that the anisotropic birefringence medium 130 constitutes a GRIN lens. More specifically, the electric field formed between the upper right edge electrode 312er, the lower right edge electrode 322er, the upper left edge electrode 312el, and the lower left edge electrode 322el may enable the anisotropic birefringence medium 130 to constitute a GRIN lens. In the present embodiment, the anisotropic birefringence medium 130 constitutes, for instance, a 0 level Fresnel lens.

As a distribution of the liquid crystal molecules 352 shown in FIG. 8, since the invention is able to make anisotropic birefringence medium 130 constitute a GRIN lens through designs of electrode patterns and voltages of the upper electrode layer 312 and the lower electrode layer 322 and the formed electric field distribution, the distribution of the liquid crystal molecules 352 has preferred tilting directions. That is, the distribution of the liquid crystal molecules 352 has preferred tilting direction of the liquid crystal molecules of the GRIN lens that is tilting from outward toward inward. Therefore, the designs of electrode patterns and voltages of the invention can prevent the occurrence of disclination lines and crosstalk, and thereby improve the display quality of a 3D display device. Furthermore, the designs of electrode patterns and voltages of the invention may raise an application rate of the liquid crystal birefringence coefficient and tolerate a relatively larger pair approximation.

Figure 9:
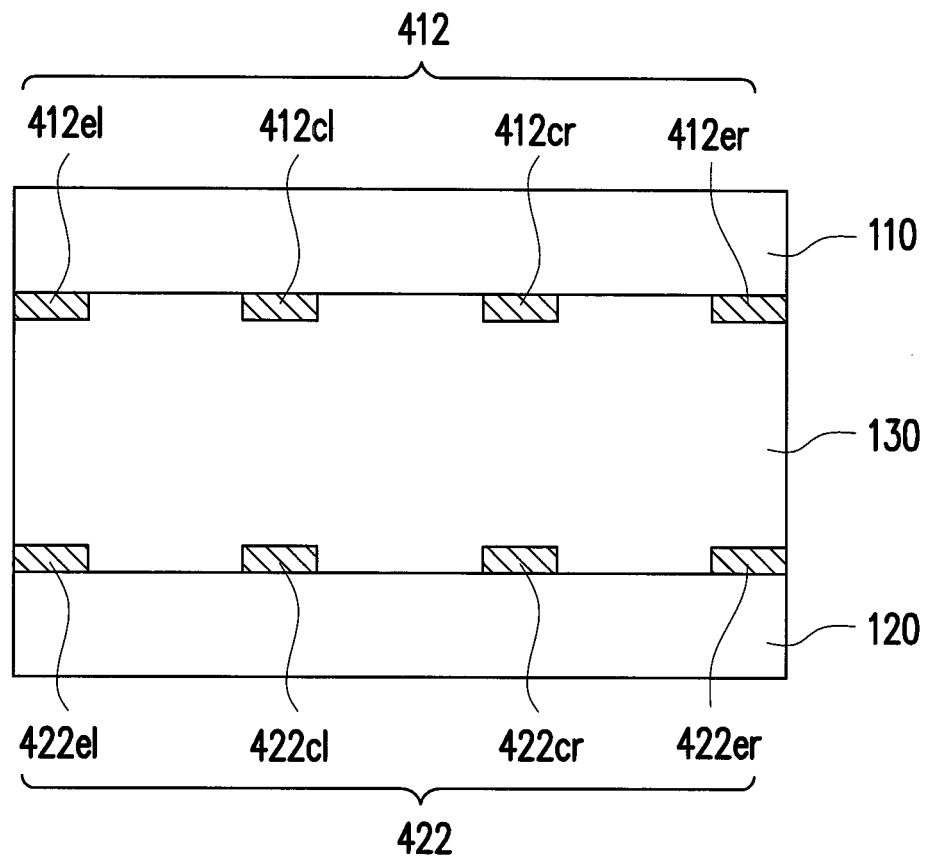
FIG. 9 is a schematic cross-sectional view illustrating a unit region of a lens structure according to the fourth embodiments of the invention.
Figure 10:
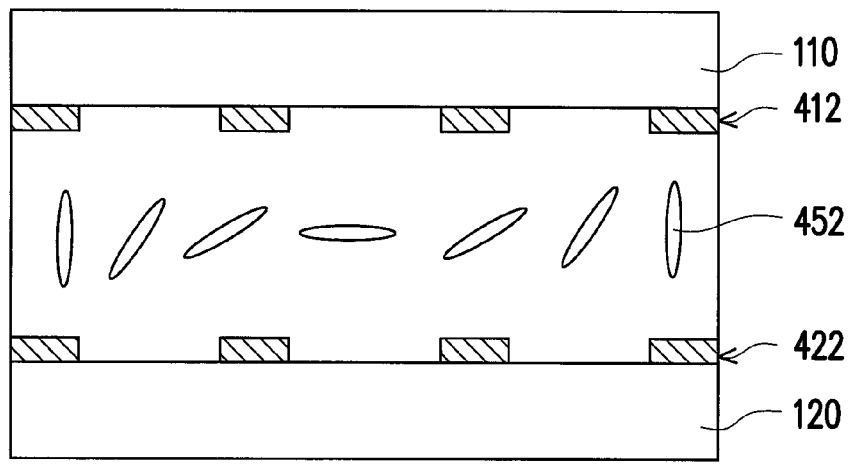
FIG. 10 is a distribution diagram of liquid crystal molecules of a unit region in a lens structure illustrated in FIG. 9.

FIG. 9 is a schematic cross-sectional view illustrating a unit region 400 of a lens structure 20 according to the fourth embodiments of the invention, and FIG. 10 is a distribution diagram of liquid crystal molecules of a unit region 400 in a lens structure 20 illustrated in FIG. 9. In the present embodiment, the lens structure 20 has, for instance, a plurality of unit regions 400. The embodiment of FIG. 9 and FIG. 10 is similar to the embodiment of FIG. 7 to FIG. 8, thus, similar or same notations represent the similar or same components, while the repeated same details are omitted.

The difference between the embodiment of FIG. 9 and FIG. 10 and above mentioned embodiment of FIG. 7 and FIG. 8 is that the electrode layer further includes a center electrode. More specifically, in the present embodiment, an upper electrode layer 412 includes an upper edge electrode 412e and an upper center electrode 412c, and a lower electrode layer 422 includes a lower edge electrode 422e and a lower center electrode 422c.

The upper center electrode 412c and the lower center electrode 422c are respectively located on the upper substrate 110 and the lower substrate 120, and the upper edge electrode 412e and the lower edge electrode 422e are respectively disposed corresponding to the upper center electrode 412c and the lower center electrode 422c. In more detail, the upper center electrode 412c includes an upper right center electrode 412cr and an upper left center electrode 412cl, and the lower center electrode 422c includes a lower right center electrode 422cr and a lower left center electrode 422cl.

It is worth being noted that, in the present embodiment, the center position of the upper center electrode 412c and the center position of the lower electrode 422c are disposed oppositely to each other. It is preferred that the upper center electrode 412c and the lower center electrode 422c are arranged in mirror symmetry. To be more specific, the center position of the upper right center electrode 412cr and the center position of the lower right center electrode 422cr are disposed oppositely to each other, and the center position of the upper left center electrode 412cl and the center position of the lower left center electrode 422cl are disposed oppositely to each other. It is preferred that the upper right center electrode 412cr and the lower right center electrode 422cr are arranged in mirror symmetry, and the upper left center electrode 412cl and the lower left center electrode 422cl are arranged in mirror symmetry.

It is also worth mentioning that, in the present embodiment, the driving voltages of the upper center electrode 412c and the lower center electrode 422c have opposite phases. In addition, a right center voltage difference $\Delta Vcr$ is between the upper right center electrode 412cr and the lower right center electrode 422cr, and a left center voltage difference $\Delta Vcl$ is between the upper left center electrode 412cl and the lower left center electrode 422cl. An absolute value of a difference between the right center electrode difference $\Delta Vcr$ and left center electrode difference $\Delta Vcl$ is within 2V, that is, $|\Delta Vcr - \Delta Vcl| \leq 2V$. Besides, the right center voltage difference $\Delta Vcr$ is smaller than the right edge voltage difference $\Delta Ver$, and the left center voltage difference $\Delta Vcl$ is smaller than the left edge voltage difference $\Delta Vel$.

As a result, in the present embodiment, an electric field distribution is formed between the upper edge electrode 412e, the lower edge electrode 422e, the center electrode 412c, and the lower center electrode 422c, such that the anisotropic birefringence medium 130 constitutes a GRIN lens. More specifically, the electric field distribution formed between the upper right edge electrode 412er, the lower right edge electrode 422er, the upper left edge electrode 412el, the lower left edge electrode 422el, the upper center electrode 412cr, the lower center electrode 422cr, the upper left center electrode 412cl, and the lower left center electrode 422cl can make the anisotropic birefringence medium 130 constitute a GRIN lens. In the present embodiment, the anisotropic birefringence medium 130 constitutes, for instance, a 0 level Fresnel lens.

As a distribution of liquid crystal molecules 452 shown in FIG. 10, since the invention is able to make the anisotropic birefringence medium 130 constitute a GRIN lens through the designs of electrode patterns and voltages of the upper electrode layer 412 and the lower electrode layer 422, the distribution of the liquid crystal molecules 452 has preferred tilting direction. That is, the distribution of liquid crystal molecules 452 has preferred tilting directions of liquid crystal molecules of a GRIN lens that is tilting from outward toward inward. Accordingly, the designs of electrode patterns and voltages of the invention may prevent the issues of disclination lines and crosstalk, and further improve the display quality of a 3D display device. Moreover, the designs of electrode patterns and voltages of the invention may raise the application rate of the liquid crystal birefringence coefficient and tolerate the relatively larger pair approximation, and may be adapted to a lens pitch, a thickness of liquid crystal layer, an orientation direction, and a pre-tilt angle that of a large range. In other words, when the lens pitch is larger, the thickness of the liquid crystal layer is thicker, the orientation direction or the pre-tilt angle is different, and then an electrode layer may include an edge electrode and a center electrode, such that the GRIN lens has preferred tilting directions of the distribution of liquid crystal molecules.

Although the aforementioned embodiment in FIG. 9 and FIG. 10 adopts an example of a center electrode having a set of right center electrodes and left center electrodes for illustration, but the invention is not limited herein. In another embodiment, a center electrode may also have plural sets of right center electrodes and left center electrodes. To be more specific, the upper center electrode 412c and the lower center electrode 422c are plural, wherein the upper center electrode 412c has a plurality of the upper right center electrodes 412cr and the upper left center electrodes 412cl, otherwise, the lower center electrode 422c has a plurality of the lower right center electrodes 422cr and the lower left center electrodes 422cl. Accordingly, the right center voltage difference $\Delta Ver$ and the left center voltage difference $\Delta Vcl$ are plural. In addition, in the present embodiment, a plurality of the right center voltage differences $\Delta Vcr$ and a plurality of the left center voltage differences $\Delta Vcl$ are reduced from the edges of the GRIN lens toward the center of the GRIN lens.

Figure 11:
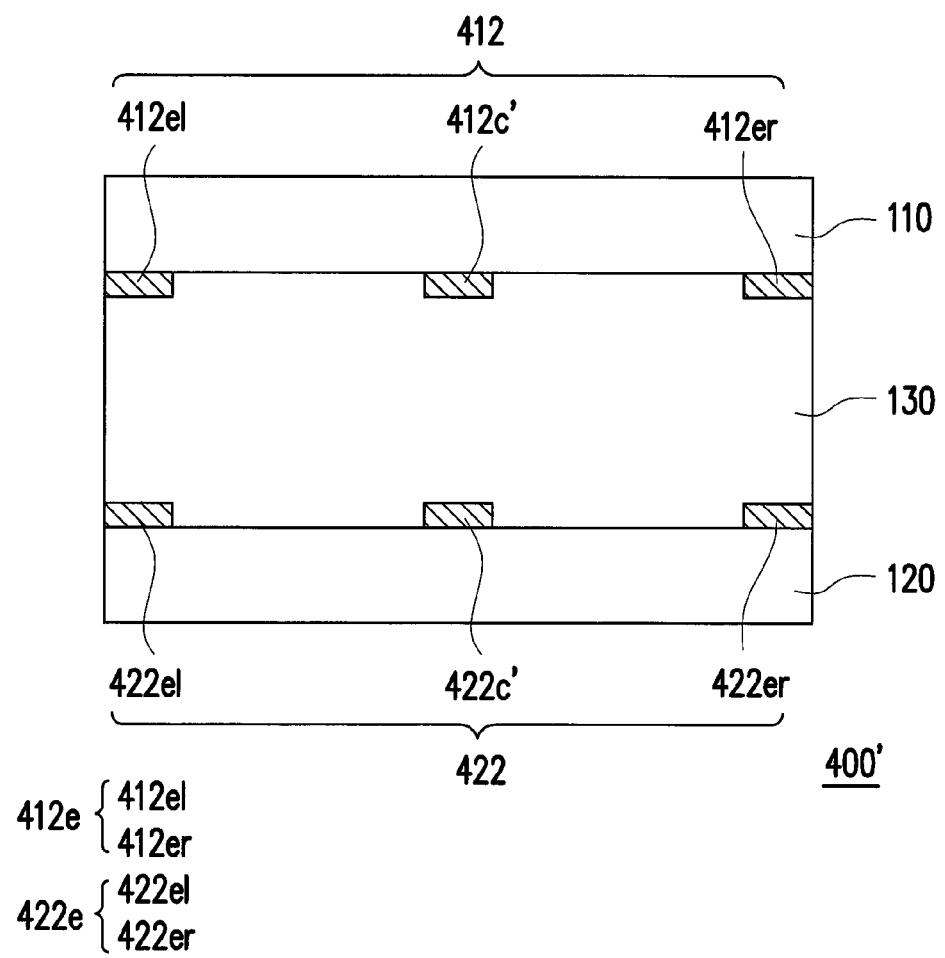
FIG. 11 is a schematic cross-sectional view illustrating a unit region of a lens structure according to the fifth embodiments of the invention.
Figure 12:
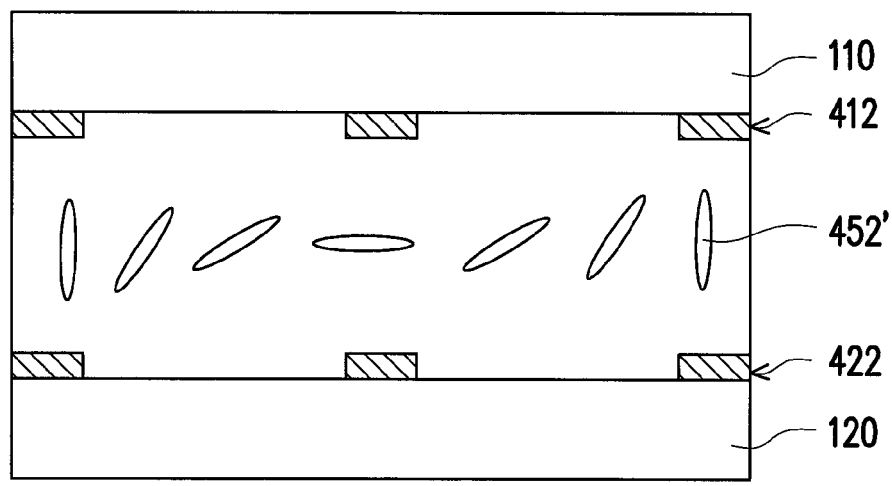
FIG. 12 is a distribution diagram of liquid crystal molecules of a unit region in a lens structure illustrated in FIG. 11.

FIG. 11 is a schematic cross-sectional view illustrating a unit region 400' of a lens structure 20 according to the fifth embodiments of the invention, and FIG. 12 is a distribution diagram of liquid crystal molecules of a unit region 400' in a lens structure 20 illustrated in FIG. 11. In the present embodiment, the lens structure 20 has, for instance, a plurality of unit regions 400'. The embodiment of FIG. 11 and FIG. 12 is similar to the embodiment of FIG. 9 and FIG. 10, thus, similar or same notations represent the similar or same components, while the repeated same details are omitted.

The difference between the embodiment of FIG. 11 and FIG. 12 and the aforementioned embodiment of FIG. 9 and FIG. 10 is that the electrode layer solely includes one set of center electrodes. To be more specific, in the present embodiment, the upper electrode layer 412 includes the upper edge electrode 412e and an upper center electrode 412c', and the lower electrode layer 422 includes the lower edge electrode 422e and a lower center electrode 422c'.

The upper center electrode 412c' and the lower center electrode 422c' are respectively located on the upper substrate 110 and the lower substrate 120, and the upper edge electrode 412e and the lower edge electrode 422e are disposed corresponding to the upper center electrode 412c' and the lower center electrode 422c' respectively. More specifically, in the present embodiment, the unit region 400' has a set of center electrodes that constituted by the upper center electrode 412c' and the lower center electrode 422c' and does not have a right center electrode and a left center electrode.

It is worth being noted that, in the present embodiment, the center position of the upper center electrode 412c' and the center position of the lower center electrode 422c' are disposed oppositely to each other. It is preferred that the upper center electrode 412c' and the lower center electrode 422c' are arranged in mirror symmetry.

It is also worth being noted that, in the present embodiment, the driving voltages of the upper center electrode 412c' and the lower center voltage 422c' have opposite phases. In addition, a center voltage difference ΔVc' exists between the upper center electrode 412c' and the lower center electrode 422c' and the center voltage difference ΔVc' is smaller than the right edge voltage difference ΔVer and the left edge voltage difference ΔVel. That is, the center voltage difference ΔVc' is the smallest.

As a consequence, in the present embodiment, an electric field distribution is formed between the upper edge electrode 412e, the lower edge electrode 422e, the upper center electrode 412c' and the lower center electrode 422c', so that the anisotropic birefringence medium 130 constitutes a GRIN lens. In the present embodiment, the anisotropic birefringence medium 130 constitutes, for instance, a 0 level Fresnel lens.

As a distribution of liquid crystal molecules 452' shown in FIG. 11, since the invention is able to make the anisotropic birefringence medium 130 constitute a GRIN lens through the designs of electrode patterns and voltages of the upper electrode layer 412 and the lower electrode layer 422, the distribution of the liquid crystal molecules 452' has preferred tilting direction, that is, the distribution of liquid crystal molecules 452' has preferred tilting directions of liquid crystal molecules of a GRIN lens that is tilting from outward toward inward. Accordingly, the designs of electrode patterns and voltages of the invention can prevent the issues of disclination lines and crosstalk, and further improve the display quality of a 3D display device. Moreover, the designs of electrode patterns and voltages of the invention may raise an application rate of the liquid crystal birefringence coefficient and tolerate a relatively larger pair approximation, and may be adapted to a lens pitch, a thickness of liquid crystal layer, a orientation direction, and a pre-tilt angle that of a large range. In other words, when the lens pitch is larger, the thickness of the liquid crystal layer is thicker, the orientation direction or a pre-tilt angle is different, and then an electrode layer can include an edge electrode and a center electrode, such that the GRIN lens has preferred tilting directions of the distribution of liquid crystal molecules.

Although the aforementioned embodiment in FIG. 11 and FIG. 12 adopts an example that solely has one set of center electrodes for illustration, but the invention is not limited herein. In another embodiment, a center electrode also may have a set of center electrodes and plural sets of right center electrodes and left center electrodes contemporarily. That is to say, in addition to a set of the center electrodes constituted by the upper enter electrode 412c' and the lower center electrode 422c', at least one set of right center electrodes and left center electrodes may also be included. Wherein, the right center electrodes and the left center electrodes may be any types of designs of the right center electrodes and the left center electrodes in the aforementioned embodiments. Moreover, in the present embodiment, a plurality of the right center voltage differences ΔVcr and a plurality the left center voltage differences ΔVcl are reduced from the edges of the GRIN lens toward the center of the GRIN lens, and the center voltage difference ΔVc' is the smallest.

In order to prove that the designs of electrode patterns and voltages of the lens structure of the invention have preferred tilting direction, an experimental example is provided for verification.

Figure 13:
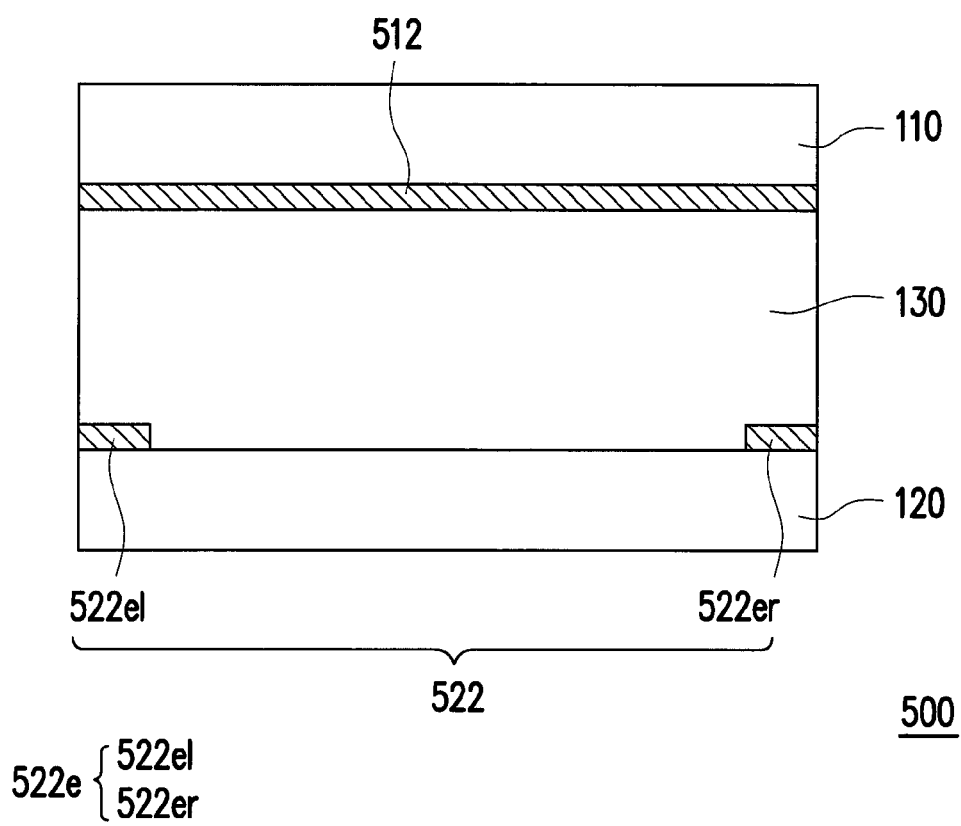
FIG. 13 is a schematic cross-sectional view illustrating a unit region of a lens structure according to a comparative example.

FIG. 13 is a schematic cross-sectional view illustrating a unit region 500 of a lens structure according to a comparative example. The structure of FIG. 13 is similar the structure of FIG. 7, hence, the similar or same notations represent similar or same components are, while the repeated same details are omitted. Referring to FIG. 13, a unit region 500 of the comparative example includes an upper electrode layer 512 and the lower electrode layer 522. The upper electrode layer 512 is an electrode covering the entire surface and connected to a common voltage. The lower electrode layer 522 includes a lower edge electrode 522e. The lower edge electrode 522e includes a lower edge electrode 522er and a lower left edge electrode 522el, deposed at the edge positions of two sides of the lower edge electrode 522. Moreover, the driving voltage of the lower right edge electrode 522er is 6V, and the driving voltage of the left edge electrode 522el is also 6V. Furthermore, the comparative example adopts vertically-aligned electrode, and the thickness of the liquid crystal layer is 25 μm, the lens pitch is 116 μm, and the width of patterning electrode is 4 μm.

Besides, the comparative example adopts the lens structure of the unit region 300 in FIG. 7, wherein the respective driving voltages of the lower right edge electrode 322er and the lower edge electrode 322el are 3V, and the respective driving voltages of the upper right edge electrode 312er and the upper left edge electrode 312el are −3V. Therefore, the right edge voltage difference ΔVer is 6V, and the left edge voltage difference ΔVer is also 6V. Moreover, the comparative example adopts vertically-aligned electrode, and the thickness of the liquid crystal layer is 25 μm, the lens pitch is 116 μm, and the width of patterning electrode is 4 μm.

Figure 14:
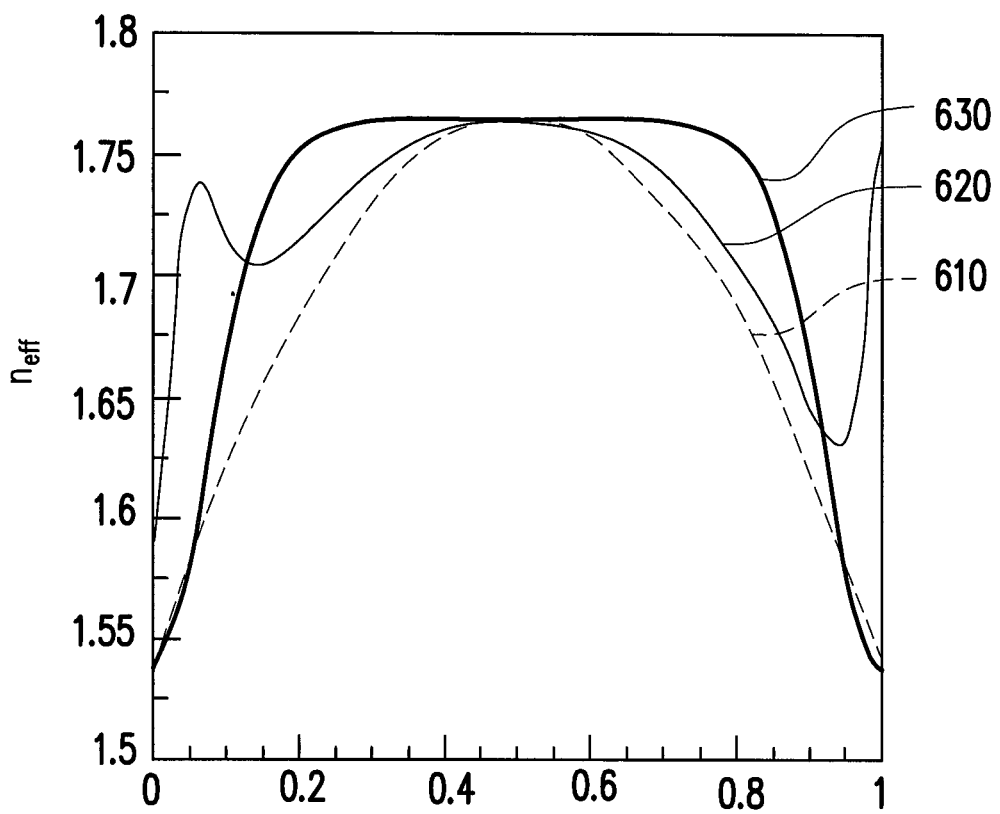
FIG. 14 is a relation graph of positions and equivalent refractive index of a unit region of a lens structure according to a comparative example and an experimental example.

FIG. 14 is a relation graph of positions (1/pitch) and equivalent refractive index ($n_{eff}$) of a unit region of a lens structure according to a comparative example and an experimental example. In FIG. 14, a curve 610 represents a curve of an ideal lens, a curve 620 represents the comparative example having the unit region 500, and a curve 630 represents the experimental example having the unit region 300. It can be learned from FIG. 14, the curve 620 of the equivalent refractive index of the comparative example is relatively non-smooth and not in the form of a parabola. Specifically, the equivalent refractive index at the edge positions of two sides of the unit region 500 that adjacent to the edge electrode 522e varies too fast, thus the disclination lines tend to occur. In contrast, owing to the experimental example having the upper and lower patterning edge electrodes and their center positions are disposed oppositely to each other, also their driving voltages have opposite phases, accordingly, the curve 630 of the equivalent refractive index of the experimental example is relatively smooth and in the form of a parabola, such that the distribution of liquid crystal molecules has preferred tilting directions, and further prevent the occurrence of disclination lines and crosstalk.

To sum up, in a lens structure and a 3D display device having the same in the invention, a electric field distribution is formed between an upper center electrode, a lower center electrode, an upper edge electrode, a lower edge electrode, at least one set of upper side electrodes and a least set of lower side electrodes, such that an anisotropic birefringence medium constitutes a Fresnel lens. Nevertheless, the invention is not limited herein, an electric field distribution may also be formed between an upper edge electrode and a lower edge electrode, or between an upper center electrode, a lower center electrode, an upper edge electrode and a lower edge electrode, so that anisotropic birefringence medium constitutes a GRIN lens (such as a 0 level Fresnel lens). Owing to the tilting directions of liquid crystal molecules in the lens structure of the invention being preferred, hence, the occurrence of disclination lines and crosstalk can be prevented, and the display quality of a 3D display device is further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is recited is:

1. A lens structure, comprising:
    an upper substrate and a lower substrate, disposed oppositely to each other;
    an anisotropic birefringence medium, located between the upper substrate and the lower substrate;
    an upper center electrode and a lower center electrode, respectively located on the upper substrate and the lower substrate;
    an upper edge electrode, located on the upper substrate and disposed corresponding to the upper center electrode;
    a lower edge electrode, located on the lower substrate and disposed corresponding to the lower center electrode;
    at least one set of upper side electrodes, located on the upper substrate, and disposed between the upper center electrode and the upper edge electrode;
    at least one set of lower side electrodes, located on the lower substrate, and disposed between the lower center electrode and the lower edge electrode,
    wherein an electric field distribution is formed between the upper center electrode, the lower center electrode, the upper edge electrode, the lower edge electrode, the at least one set of upper side electrodes, and the at least one set of lower side electrodes, such that the anisotropic birefringence medium constitutes a Fresnel lens.

2. The lens structure as recited in claim 1, wherein the each set of upper side electrodes comprise an upper side main electrode and an upper side auxiliary electrode;
    and the each set of the lower side electrodes comprise a lower side main electrode and a lower side auxiliary electrode.

3. The lens structure as recited in claim 2, wherein an upper side slit is between the upper side main electrode and the upper side auxiliary electrode, and a lower side slit is between the lower side main electrode and the lower side auxiliary electrode.

4. The lens structure as recited in claim 3, wherein a width difference between the upper side slit and the lower side slit is within 5 microns.

5. The lens structure as recited in claim 3, wherein a difference between a vertical projection of a center position of the upper side slit on the lower substrate and a center position of the lower side slit is within 5 microns.

6. The lens structure as recited in claim 2, wherein:
    a voltage of the upper edge electrode is Ve, a voltage of the lower edge electrode is Ve';
    a voltage of the upper side main electrode is Vf, a voltage of the lower side main electrode is Vf';
    a voltage of the upper side auxiliary electrode is Vm, a voltage of the lower side auxiliary electrode is Vm'; and
    a threshold voltage of the anisotropic birefringence medium is Vt.

7. The lens structure as recited in claim 6, wherein:
    as it is $|Ve'|>|Vt|$ and $|Vf'|>|Vt|$, then $|Vm|>|Vm'|$,
    as it is $|Ve|>|Vt|$ and $|Vf|>|Vt|$, then $|Vm'|>|Vm|$.

8. The lens structure as recited in claim 6, wherein:
    as it is $|Ve|>|Vt|$, then $|Ve|>|Vf'|>|Vm|>|Vm'|$,
    as it is $|Ve'|>|Vt|$, then $|Ve'|>|Vf|>|Vm'|>|Vm|$.

9. The lens structure as recited in claim 8, wherein:
    as it is $|Ve|>|Vt|$, then $|Vm'|=0\sim(\frac{1}{4})\times|Ve|$,
    as it is $|Ve'|>|Vt|$, then $|Vm|=0\sim(\frac{1}{4})\times|Ve'|$.

10. The lens structure as recited in claim 8, wherein:
    as it is $|Ve|>|Vt|$, then $|Vm-Vm'|=0\sim(\frac{1}{2})\times|Ve|$,
    as it is $|Ve'|>|Vt|$, then $|Vm'-Vm|=0\sim(\frac{1}{2})\times|Ve'|$.

11. The lens structure as recited in claim 1, wherein one of the upper edge electrode and the lower edge electrode has a driving voltage (Ve), and an absolute value of a voltage of the other one is less than an absolute value of a threshold voltage (Vt) of the anisotropic birefringence medium.

12. The lens structure as recited in claim 1, wherein one of the at least one set of upper side electrodes and the at least one set of lower side electrodes has a driving voltage (Vf), and an absolute value of a voltage of the other one is less than an absolute value of a threshold voltage (Vt) of the anisotropic birefringence medium.

13. The lens structure as recited in claim 1, wherein:
    the upper edge electrode comprises an upper right edge electrode and an upper left edge electrode, correspondingly disposed at two sides of the upper center electrode;
    the lower edge electrode comprises a lower right edge electrode and a lower left edge electrode, correspondingly disposed at two sides of the lower center electrode;
    the at least one set of the upper side electrodes comprise at least one set of upper right side electrodes and at least one set of upper left side electrodes, respectively disposed between the upper center electrode and the upper right edge electrode and between the upper center electrode and the upper left edge electrode;
    the at least one set of lower side electrodes comprise at least one set of lower right side electrodes and at least one set of lower left side electrodes, respectively disposed between the lower center electrode and the lower right edge electrode and between the lower center electrode and the lower left edge electrode; and
    the anisotropic birefringence medium constitutes the Fresnel lens through the electric field distribution formed between the upper center electrode, the lower center electrode, the upper right edge electrode, the upper left edge electrode, the lower right edge electrode, the lower left edge electrode, the at least one set of upper right side electrodes, the at least one set of upper left side electrodes, the at least one set of lower right side electrodes and the at least one set of lower left side electrodes.

14. The lens structure as recited in claim 13, wherein:
    the each set of upper right side electrodes comprise an upper right side main electrode and an upper right side auxiliary electrode;
    the each set of upper left side electrodes comprise an upper left side main electrode and an upper left side auxiliary electrode;
    the each set of lower right side electrodes comprise a lower right side main electrode and a lower right side auxiliary electrode; and
    the each set of lower left side electrodes comprise a lower left side main electrode and a lower left side auxiliary electrode.

15. The lens structure as recited in claim 14, wherein an upper right side slit is between the upper right main electrode and the upper right auxiliary electrode, an upper left side slit is between the upper left side main electrode and the upper left side auxiliary electrode, a lower right side slit is between the lower right side main electrode and the lower right side auxiliary electrode, and a lower left side slit is between the lower left side main electrode and the lower left side auxiliary electrode.

16. The lens structure as recited in claim 13, wherein the upper center electrode, the lower center electrode, the upper right edge electrode, the upper left edge electrode, the lower right edge electrode, the lower left edge electrode, the at least one set of upper right side electrodes, the at least one set of upper left side electrodes, the at least one set of lower right side electrodes and the at least one set of lower left side electrodes are arranged in mirror symmetry.

17. A 3D display device, comprising:
a display panel; and
a lens structure, located on one side of the display panel, wherein the lens structure is as described in claim 1.

18. A lens structure, having a plurality of unit regions, wherein each of the unit regions of the lens structure comprises:
an upper substrate and a lower substrate, disposed oppositely to each other;
an anisotropic birefringence medium, located between the upper substrate and the lower substrate;
an upper edge electrode, located on the upper substrate; and
a lower edge electrode, located on the lower substrate,
wherein driving voltages of the upper edge electrode and the lower edge electrode have opposite phases, and center positions of the upper edge electrode and the lower edge electrode are oppositely disposed, an electric field distribution is formed between the upper edge electrode and the lower edge electrode, such that the anisotropic birefringence structure constitutes a gradient-index lens.

19. The lens structure as recited in claim 18, wherein the upper edge electrode and the lower edge electrode are arranged in mirror symmetry.

20. The lens structure as recited in claim 18, wherein the upper edge electrode comprises an upper right edge electrode and an upper left edge electrode, and the lower edge electrode comprises a lower right edge electrode and a lower left edge electrode.

21. The lens structure as recited in claim 20, wherein a right edge voltage difference ($\Delta Ver$) is between the upper right edge electrode and the lower right edge electrode, a left edge voltage difference ($\Delta Vel$) is between the upper left edge electrode and the lower left edge electrode.

22. The lens structure as recited in claim 21, wherein an absolute value of a difference between the right edge voltage difference and the left edge voltage difference is within 2V.

23. The lens structure as recited in claim 18, further comprising an upper center electrode and a lower center electrode, respectively located on the upper substrate and the lower substrate, the upper edge electrode and the lower edge electrode respectively disposed corresponding to the upper center electrode and the lower center electrode.

24. The lens structure as recited in claim 23, wherein driving voltages of the upper center electrode and the lower center electrode have opposite phases, and center positions of the upper center electrode and the lower center electrode are disposed oppositely to each other, the electric field distribution is formed between the upper edge electrode, the lower edge electrode, the upper center electrode and the lower center electrode.

25. The lens structure as recited in claim 23, wherein the upper center electrode and the lower center electrode are arranged in mirror symmetry.

26. The lens structure as recited in claim 23, wherein the upper center electrode comprises an upper right center electrode and an upper left center electrode, and the lower center electrode comprises a lower right center electrode and a lower left center electrode.

27. The lens structure as recited in claim 26, wherein a right center voltage difference ($\Delta Vcr$) is between the upper right center electrode and the lower right center electrode, and a left center voltage difference ($\Delta Vcl$) is between the upper left center electrode and the lower left center electrode.

28. The lens structure as recited in claim 27, wherein an absolute value of a difference between the right center voltage difference and the left center voltage difference is within 2V.

29. The lens structure as recited in claim 27, wherein the right center voltage difference is less than the right edge voltage difference, and the left center voltage difference is less than the left edge voltage difference.

30. The lens structure as recited in claim 29, wherein the upper center electrode and the lower center electrode are plural, and the right center voltage difference and the left center voltage difference are plural, in addition, the right center voltage differences and the left center voltage differences are gradually reduced from edges of the gradient-index lens toward a center of the gradient-index lens.

31. A 3D display device, comprising:
a display panel; and
a lens structure, located on one side of the display panel, wherein the lens structure is as described in claim 18.

* * * * *